(12) United States Patent
Kwangkaew et al.

(10) Patent No.: US 11,520,074 B2
(45) Date of Patent: Dec. 6, 2022

(54) PROXIMITY SENSOR WITH LIGHT BLOCKING BARRIER COMPRISING A GAP HAVING A CROSS-SECTION WITH PARALLEL WALLS BETWEEN EMITTER AND DETECTOR

(71) Applicant: HANA Microelectronics, Inc., Santa Clara, CA (US)

(72) Inventors: Vanapong Kwangkaew, Wang Noi (TH); Sirirat Silapapipat, Ladroad (TH); Sanjay Mitra, Colorado Springs, CO (US)

( * ) Notice: Subject to any disclaimer, the term of this patent is extended or adjusted under 35 U.S.C. 154(b) by 52 days.

(21) Appl. No.: 16/226,435

(22) Filed: Dec. 19, 2018

(65) Prior Publication Data

US 2020/0088906 A1 Mar. 19, 2020

Related U.S. Application Data

(60) Provisional application No. 62/731,765, filed on Sep. 14, 2018.

(51) Int. Cl.
*G01S 7/48* (2006.01)
*G01V 8/12* (2006.01)

(52) U.S. Cl.
CPC ..................... *G01V 8/12* (2013.01)

(58) Field of Classification Search
CPC ... G01V 8/12; G01V 8/10; G01V 8/20; H01L 31/167; H01L 31/173; G01S 17/04; G01S 7/48; G01J 1/0209; G01J 1/0214; G01J 1/06

USPC ......................... 250/221, 239, 216
See application file for complete search history.

(56) References Cited

U.S. PATENT DOCUMENTS

| | | | |
|---|---|---|---|
| 8,604,436 B1 * | 12/2013 | Patel | H03K 17/941 250/338.1 |
| 9,201,894 B2 | 12/2015 | Fukuda et al. | |
| 9,525,093 B2 * | 12/2016 | Costello | G01S 7/4813 |
| 2005/0032474 A1 | 2/2005 | Gordon | |
| 2006/0237540 A1 | 10/2006 | Saxena | |
| 2007/0046629 A1 | 3/2007 | Chi-Boon et al. | |
| 2007/0090282 A1 | 4/2007 | Chin et al. | |
| 2008/0011939 A1 | 1/2008 | Yee et al. | |
| 2008/0205495 A1 | 8/2008 | Trott | |
| 2008/0296478 A1 | 12/2008 | Hernoult | |
| 2009/0159900 A1 | 6/2009 | Basoor et al. | |
| 2010/0258710 A1 | 10/2010 | Wiese et al. | |
| 2010/0282951 A1 | 11/2010 | Costello et al. | |
| 2010/0327164 A1 | 12/2010 | Costello et al. | |
| 2011/0024627 A1 | 2/2011 | Yao | |
| 2011/0057102 A1 | 3/2011 | Yao | |
| 2011/0057104 A1 | 3/2011 | Yao et al. | |

(Continued)

FOREIGN PATENT DOCUMENTS

| | | |
|---|---|---|
| GB | 2486000 A | 6/2012 |
| GB | 2490386 A | 10/2012 |

(Continued)

*Primary Examiner* — Que Tan Le
(74) *Attorney, Agent, or Firm* — West & Associates, A PC; Stuart J. West; Charlotte Rodeen-Dickert

(57) ABSTRACT

A sensor comprising a light emitter and light detector directly covered and encapsulated by a layer of light transmissive compound. A gap in the light transmissive compound between the light emitter and the light detector filled with a light blocking barrier.

8 Claims, 14 Drawing Sheets

(56) References Cited

U.S. PATENT DOCUMENTS

| | | |
|---|---|---|
| 2011/0057108 A1 | 3/2011 | Yao et al. |
| 2011/0057129 A1 | 3/2011 | Yao et al. |
| 2011/0121182 A1 | 5/2011 | Wong et al. |
| 2011/0133941 A1 | 6/2011 | Yao et al. |
| 2011/0163233 A1 | 7/2011 | Ng et al. |
| 2011/0186736 A1 | 8/2011 | Yao et al. |
| 2011/0204233 A1 | 8/2011 | Costello et al. |
| 2011/0296478 A1 | 12/2011 | Jin |
| 2011/0297831 A1 | 12/2011 | Yao et al. |
| 2011/0297832 A1 | 12/2011 | Yao et al. |
| 2012/0037793 A1 | 2/2012 | Ong et al. |
| 2012/0145932 A1 | 6/2012 | Yao et al. |
| 2012/0160994 A1 | 6/2012 | Costello et al. |
| 2012/0293472 A1 | 11/2012 | Wong et al. |
| 2013/0010310 A1 | 1/2013 | Wong et al. |
| 2013/0026350 A1 | 1/2013 | Yao et al. |
| 2013/0048837 A1 | 2/2013 | Pope et al. |
| 2013/0256926 A1 | 10/2013 | Dinesen |
| 2014/0223734 A1 | 8/2014 | Song et al. |
| 2014/0252213 A1 | 9/2014 | Ruh |
| 2015/0008329 A1 | 1/2015 | Chen et al. |
| 2015/0330772 A1 | 11/2015 | Charusabha et al. |
| 2016/0282510 A1 | 9/2016 | Kwangkaew et al. |
| 2016/0306042 A1 | 10/2016 | Schrank et al. |
| 2017/0052277 A1 | 2/2017 | Wong et al. |
| 2017/0184764 A1 | 6/2017 | Matsuyuki et al. |
| 2018/0081093 A1 | 3/2018 | Wang et al. |

FOREIGN PATENT DOCUMENTS

| | | |
|---|---|---|
| KR | 20120007533 A | 1/2012 |
| WO | 2016154582 A1 | 9/2016 |

\* cited by examiner

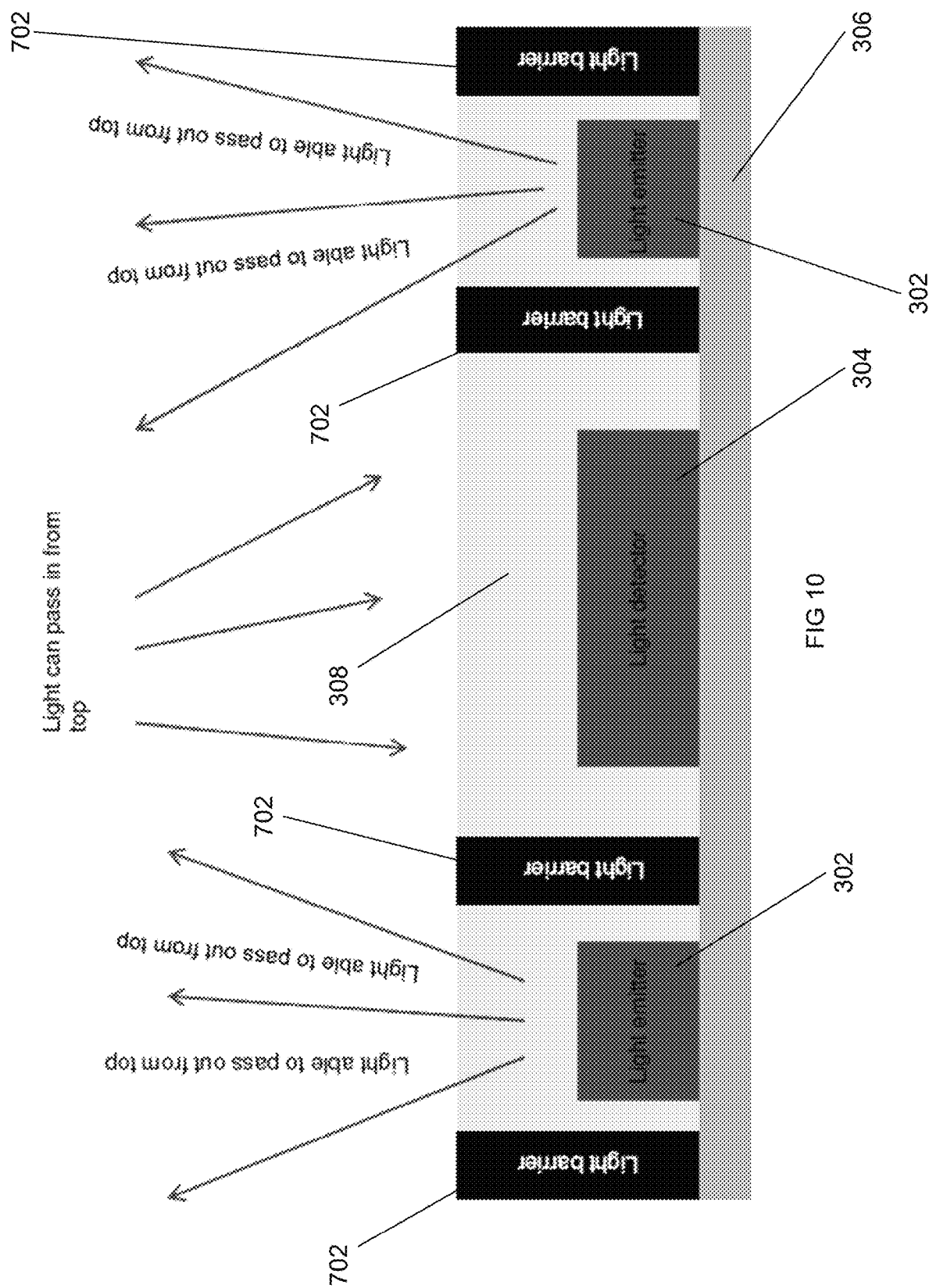

PROXIMITY SENSOR WITH LIGHT BLOCKING BARRIER COMPRISING A GAP HAVING A CROSS-SECTION WITH PARALLEL WALLS BETWEEN EMITTER AND DETECTOR

CROSS REFERENCE TO RELATED APPLICATIONS

This application claims priority under 35 U.S.C. § 119(e) from earlier filed U.S. Provisional Application Ser. No. 62/731,765, filed Sep. 14, 2018. The entirety of the above-listed provisional application is incorporated herein by reference.

BACKGROUND

Field of the Invention

The present disclosure relates to proximity, color, gesture, and/or motion sensors, particularly optical sensors having an infrared ink coating.

Background Summary

Proximity, color, gesture, and motion sensors are often used in a variety of devices, including mobile phones, personal media players, tablet computers, laptop computers, amusement and vending machines, industrial machinery, contactless switches, automated sanitary machinery, and other devices. By way of a non-limiting example, some mobile phones incorporate a proximity sensor near the mobile phone's touchscreen so that the screen can be turned off to save power and to avoid unwanted touch inputs when the mobile phone is being used, and a user's head is near to or touching the screen.

FIG. 1 depicts a prior art optical proximity sensor 100. Optical proximity sensors 100 can comprise one or more light emitters 102 and one or more light detectors 104. In some embodiments, light emitters 102 can be light emitting diodes (LEDs) that emit infrared light, and light detectors 104 can be photodiodes configured to detect infrared light. As can be seen from FIG. 1, when an object 108 is located proximate to the optical proximity sensor 100, infrared light 106 emitted by the light emitter 102 can be reflected off of the object 108 and be directed back toward the light detector 104. The reflected rays of infrared light 106 can be detected by a light detector 104, which can provide an indication that the object 108 is proximate to the optical proximity sensor 100, and/or can provide information about the motion of the object 108 relative to an optical proximity sensor 100 such that an optical proximity sensor 100 can act as a motion sensor or gesture sensor.

Crosstalk can be undesirable interactions between light emitters 102 and light detectors 104 in optical proximity sensors 100. Crosstalk can occur when light travels directly or indirectly from a light emitter 102 to a light detector 104 without being reflected off of a nearby object 108, thereby leading to false positives in motion or proximity detection. To decrease the level of crosstalk between light emitters 102 light detectors 104, many optical proximity sensors 100 have one or more blocking components 110 placed or formed between light emitters 102 and light detectors 104 to block at least some non-reflected light transmission between light emitters 102 and light detectors 104.

In many optical proximity sensors 100, a blocking component 110 can be a shield, such as a metal shield or a shield of any other material that blocks the transmission of infrared light. Shields are often manufactured separately, and are placed between a light emitter 102 and light detector 104 during assembly of an optical proximity sensor 100, as shown in FIG. 1. However, the use of a separately manufactured metal shield can add manufacturing expenses due to the materials cost of the metal or other infrared-blocking material, the often small size of the shields, and the cost of custom machinery to form the shield and to place the shield during assembly. Additionally, a shield can be dented or deformed during use, or can come loose and be displaced from the rest of an optical proximity sensor 100. As the placement and structural form of a blocking component 110 can be important in inhibiting light transfer in certain directions to limit crosstalk, deformation or displacement of the shield can lead to decreased performance of an optical proximity sensor 100 by allowing higher levels of crosstalk.

In other optical proximity sensors 100, a blocking component 110 can be a light blocking compound 112 that blocks transmission of substantially all light within a particular spectrum through a light blocking compound 112, as shown in FIG. 2. Optical proximity sensors 100 that comprise light blocking compounds 112 have traditionally been formed using a double mold process in combination with light transmissive compounds 114 that allow the transmission of substantially all light within a particular spectrum.

In a double mold manufacturing process, light transmissive compounds 114 are first encapsulated over a light emitter 102 and light detector 104. Light transmissive compounds 114 are molded over and around a light emitter 102 and light detector 104 and are allowed to cure. After light transmissive compounds 114 have cured, a light blocking compound 112 is molded over and around light transmissive compounds 114, filling a space between a light emitter 102 and light detector 104 as shown in FIG. 2, such that light emitted by a light emitter 102 will be blocked by a light blocking compound 112 from passing directly to a light detector 104. Light blocking compound 112 is generally molded to leave apertures 116 above a light emitter 102 and light detector 104, such that light emitted by a light emitter 102 can pass through a light transmissive component 114a encapsulating a light emitter 102, exit a proximity sensor 100 through an aperture 116a above a light emitter 102, be reflected by an external object 108, re-enter a proximity sensor 100 through an aperture 116b above a light detector 104, pass through a light transmissive component encapsulating a light detector 104, and finally enter a light detector 104 itself to be detected.

However, this double mold process can be expensive due to the need to use two different types of molding compounds. It can also take a long time, because light transmissive compounds 114 must first be molded and allowed to cure over a light emitter 102 and light detector 104, and only then can light blocking compounds 112 be molded over the previously molded light transmissive compounds 114. Additionally, special molds must be made and used to form apertures 116 that keep the light blocking compound 112 from completely covering light transmissive compounds 114.

What is needed is a sensor with a layer of infrared light blocking ink partially covering and inhibiting direct communication between a light emitter and light detector, such that the layer of infrared light blocking ink blocks crosstalk between a light emitter and light detector.

BRIEF DESCRIPTION OF THE DRAWINGS

FIG. 10 depicts an alternate embodiment of a sensor comprising a light blocking barrier inhibiting direct communication between a light emitter and light detector.

DETAILED DESCRIPTION

Figure 1:
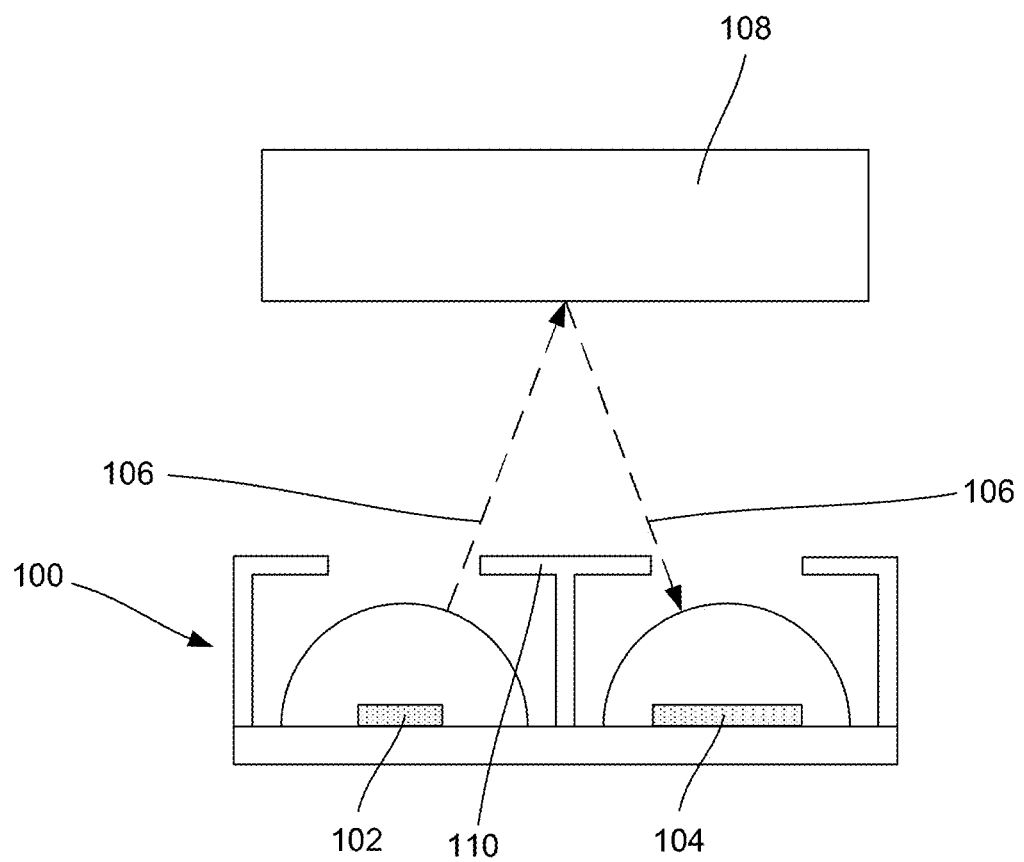
FIG. 1 depicts a first prior art proximity sensor.
Figure 2:
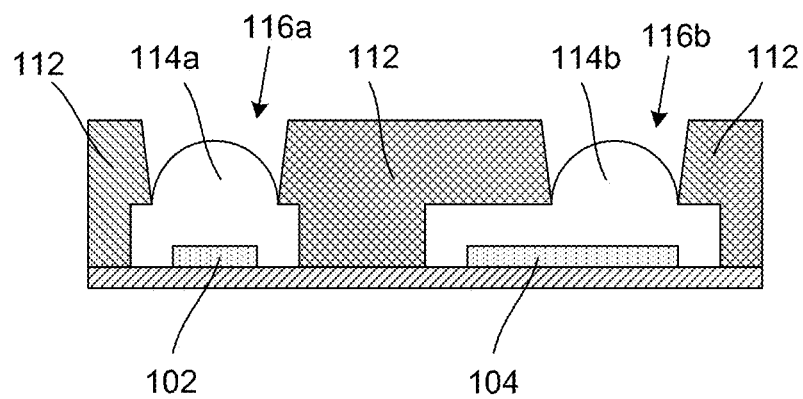
FIG. 2 depicts a second prior art proximity sensor made with a double mold process.
Figure 3:
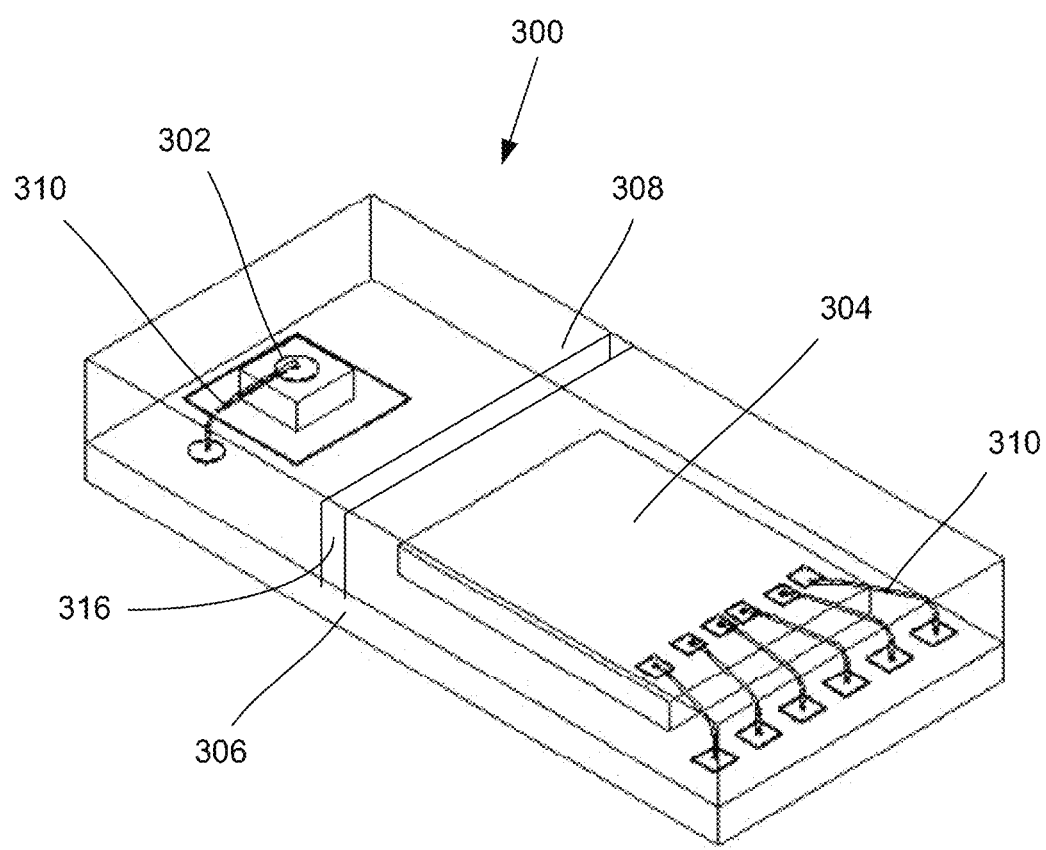
FIG. 3 depicts an embodiment of a sensor comprising an infrared light blocking ink partially covering and inhibiting direct communication between a light emitter and light detector.

FIG. 3 depicts an angled view of an embodiment of a sensor 300. A sensor 300 can be a proximity sensor, color sensor, gesture sensor, and/or motion sensor that detects nearby objects, motion of objects, light intensity, and/or light color. A sensor 300 can comprise a light emitter 302, a light detector 304, a base 306, and an optically transmissive compound 308.

A light emitter 302 can be a light source configured to emit light. In some embodiments, the light emitter 302 can be an emitter die configured to emit infrared light. By way of a non-limiting example, in some embodiments a light emitter 302 can be an infrared light emitting diode (IR LED). In alternate embodiments a light emitter 302 can be an emitter die configured to emit light at any desired wavelength or range of wavelengths within the electromagnetic spectrum. A light emitter 302 can be a bare die, prepackaged die, and/or any other type of die.

A light detector 304 can be a photodiode or other light detector configured to detect light entering a light detector 304. In some embodiments, a light detector 304 can be configured to detect infrared light. By way of a non-limiting example, in some embodiments a light detector 304 can be an infrared-responding photodiode or a die configured to detect infrared light. In alternate embodiments a light detector 304 can be configured to detect light at any desired wavelength or range of wavelengths within the electromagnetic spectrum. In some embodiments, a light detector 304 can comprise an integrated circuit configured to detect direct or reflected light entering a light detector 304.

A light emitter 302 and light detector 304 can each be mounted on different locations on a base 306. A base 306 can be a printed circuit board (PCB) or other substrate upon which other components of a sensor 300 can be mounted. In some embodiments a base 306 can comprise conductive elements such as, but not limited to, a lead frame, individual leads, and/or metal trace input/output components. By way of a non-limiting example, in some embodiments a base 306 can have conductive elements comprising copper alloy. In other embodiments, a base 306 can have conductive elements comprising other types of conductive metal, metal alloys, or other conductive material, such as copper, ferrous alloys, nickel, cobalt, chromium, nickel alloys, silver, and/or gold, or any other known and/or convenient conductive material.

Components of a sensor 300, such as a light emitter 302 and a light detector 304, can be electrically coupled with conductive elements of a base 306 using wirebonding 310, conductive solder, or other electrical connections. A sensor 300 can also be electrically coupled with other one or more other components as part of a larger device by connecting them to conductive elements of a base 306. By way of a non-limiting example, a sensor 300 can be installed within a larger device such as, but not limited to, a mobile phone by connecting electrically conductive leads of a base 306 to electrically conductive components of a mobile phone.

In some embodiments a base 306 can further comprise non-conductive elements positioned between some or all conductive elements, such as epoxy molding compounds, organic material, and/or any other desired material. By way of non-limiting examples, a base 306 can comprise a laminated substrate such as an FR-4 epoxy-based laminate or a resin-based BT (Bismaleimide-Triazine) epoxy.

The structure formed by a light emitter 302, light detector 304, and a base 306 can be directly covered with a layer of an optically transmissive compound 308 to encapsulate a light emitter 302 and light detector 304 within the optically transmissive compound 308. An optically transmissive compound 308 can comprise an optically transmissive material that allows the transmission of some or all of a spectrum of light through an optically transmissive material.

The optically transmissive compound 308 can be molded or cast directly over the entirety of the structure formed by a base 306, light emitter 302, and light detector 304. Because a light emitter 302 and light detector 304 are mounted on different locations on a base 306, an optically transmissive compound 308 can fill the space between a light emitter 302 and a light detector 304 above a base 306.

In the embodiment depicted in FIG. 3, an optically transmissive compound 308 can include a gap 316 placed between a light emitter 302 and a light detector 304.

Figure 4A:
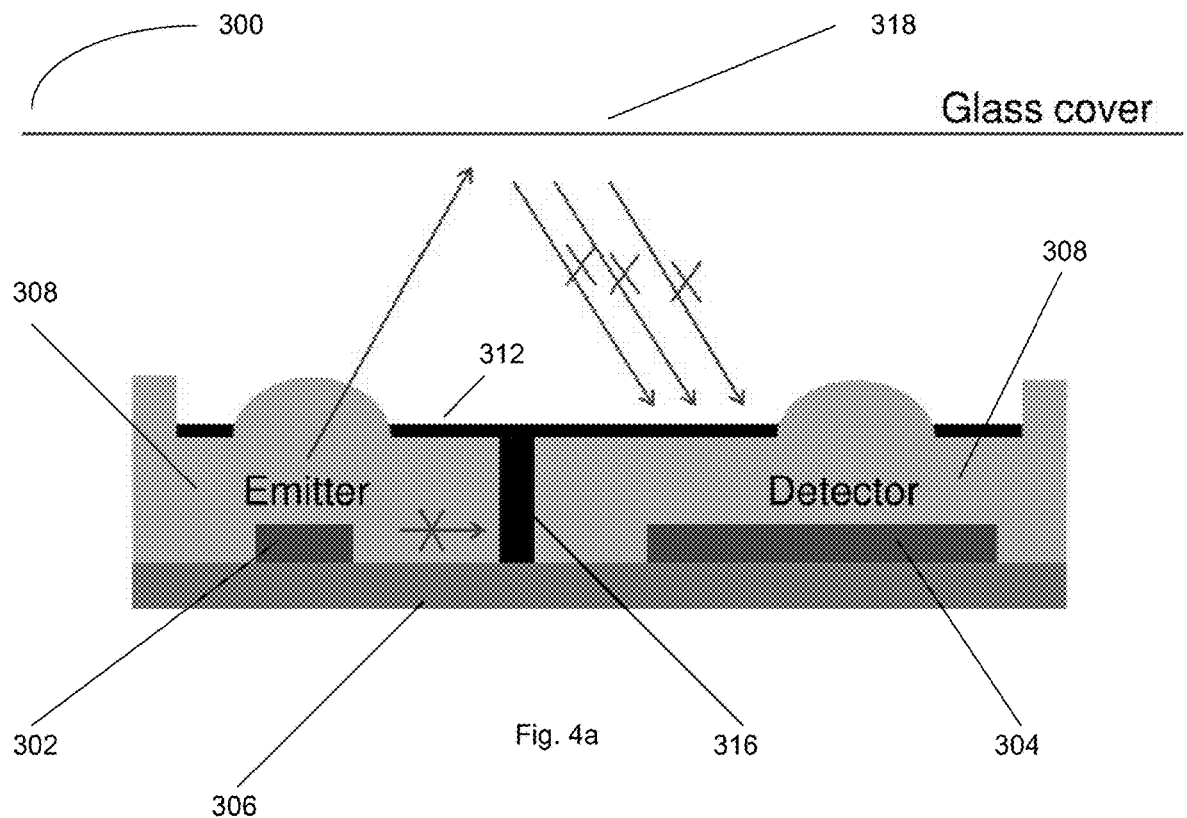
FIGS. 4a and 4b depict side views of a cross section of a sensor comprising an infrared light blocking ink partially covering and inhibiting direct communication between a light emitter and light detector.
Figure 4B:
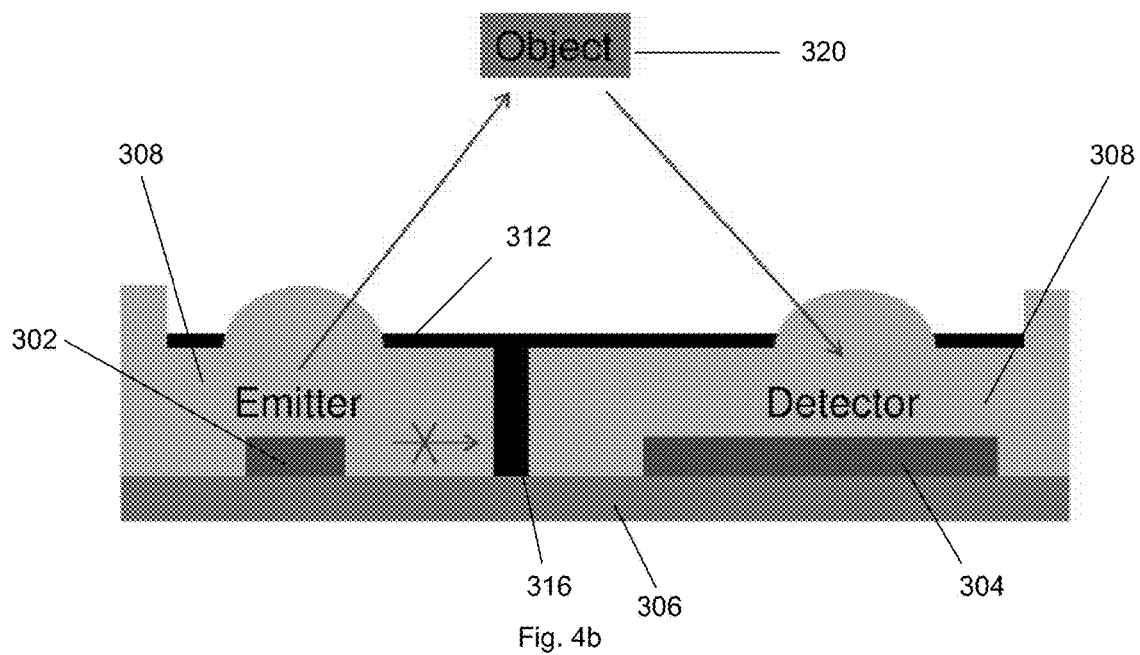

As shown in FIGS. 4a and 4b, although an optically transmissive compound 308 can directly cover a light emitter 302 and light detector 304, an optically transmissive compound 308 can be formed with a gap 316 between a light emitter 302 and a light detector 304, and that gap can be filled with an infrared ink 312 adapted and configured to inhibit direct light transmission between a light emitter 302 and a light detector 304. Additionally, infrared ink 312 can be applied to the top surface of the device, leaving apertures above a light emitter 302 and a light detector 304 through which light can be reflected off an object 320 and detected by a light detector for sensing an object 320. In some embodiments, a sensor 300 can be contained under a glass or other reflective or partially reflective cover 318, and a deposit pattern of infrared ink 312 on the top surface of a sensor 300 can be configured such that errant and/or partial reflections off a cover 318 are not detected by a light detector 304. In some embodiments, a light detector 304 can be configured to detect such a decreased level of the originally emitted light level as a positive indicator when detecting proximity, motion, gestures, color, or any other desired parameter.

As shown in FIG. 4, although light can be substantially blocked out by an infrared ink 312 contained within a gap 316 when traveling directly from a light emitter 302 to a light detector 304, light originating from a light emitter 302 can indirectly reach a light detector 304 when it is reflected off an exterior object 320 and re-enters a sensor 300 through an aperture above a light detector 304.

Figure 5:
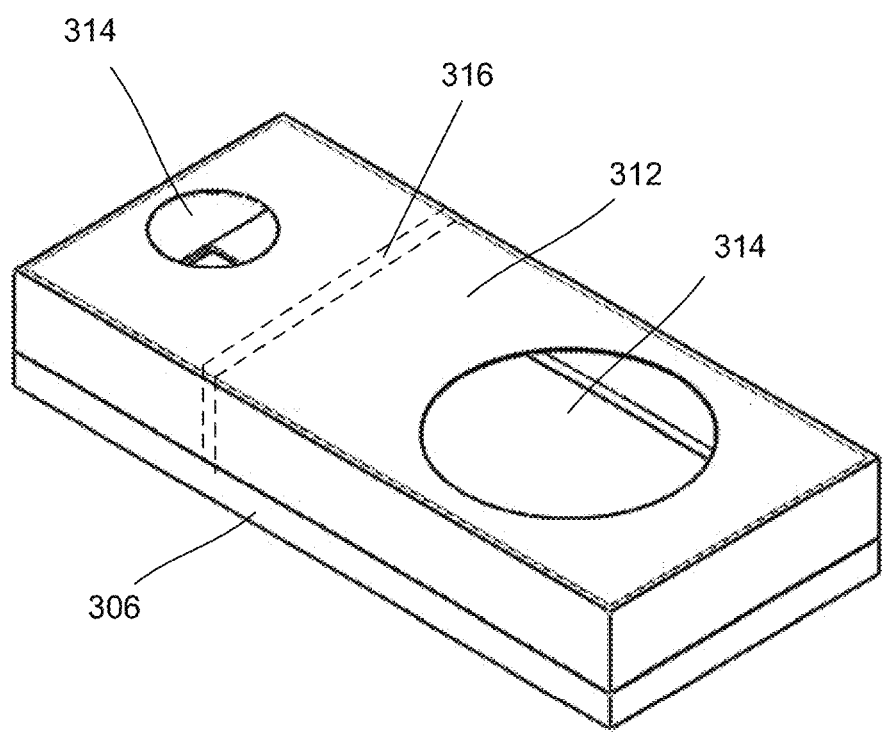
FIG. 5 depicts an isometric view of one embodiment of a sensor comprising an infrared light blocking ink partially covering and inhibiting direct communication between a light emitter and light detector.

Although in some embodiments a sensor's 300 exterior can be formed by an optically transmissive compound 308 and a base 306 and can be otherwise uncovered, in some other embodiments a sensor's 300 top and/or sides can be substantially covered with an opaque light blocking material and/or an infrared ink 312, as shown in FIG. 5. An opaque light blocking material and/or infrared ink 312 can be configured to block or filter transmission of substantially the same type of light blocked by an optically transmissive compound 308. By way of a non-limiting example, an opaque light blocking material and/or infrared ink 312 can be compound GE100LFCG. An opaque light blocking material and/or infrared ink 312 can be formed with apertures 314 above a light emitter 302 and light detector 304, as shown in FIG. 5. In some embodiments, an opaque light blocking material and/or infrared ink 312 can be a compound cast or molded around a sensor 300.

In embodiments with an additional opaque light blocking material and/or infrared ink 312 around the exterior of a sensor 300, an opaque light blocking material and/or infrared ink 312 can block or inhibit most light originating from sources outside a sensor 300 from entering a sensor 300, passing through a layer of optically transmissive compound 308, and reaching a light detector 304. However, apertures 314 in an opaque light blocking material can still allow light from a light emitter 320 reflected to re-enter a sensor 300 through the other aperture 314 to pass through an optically transmissive compound 308 and be detected by a light detector 304.

Figure 6:
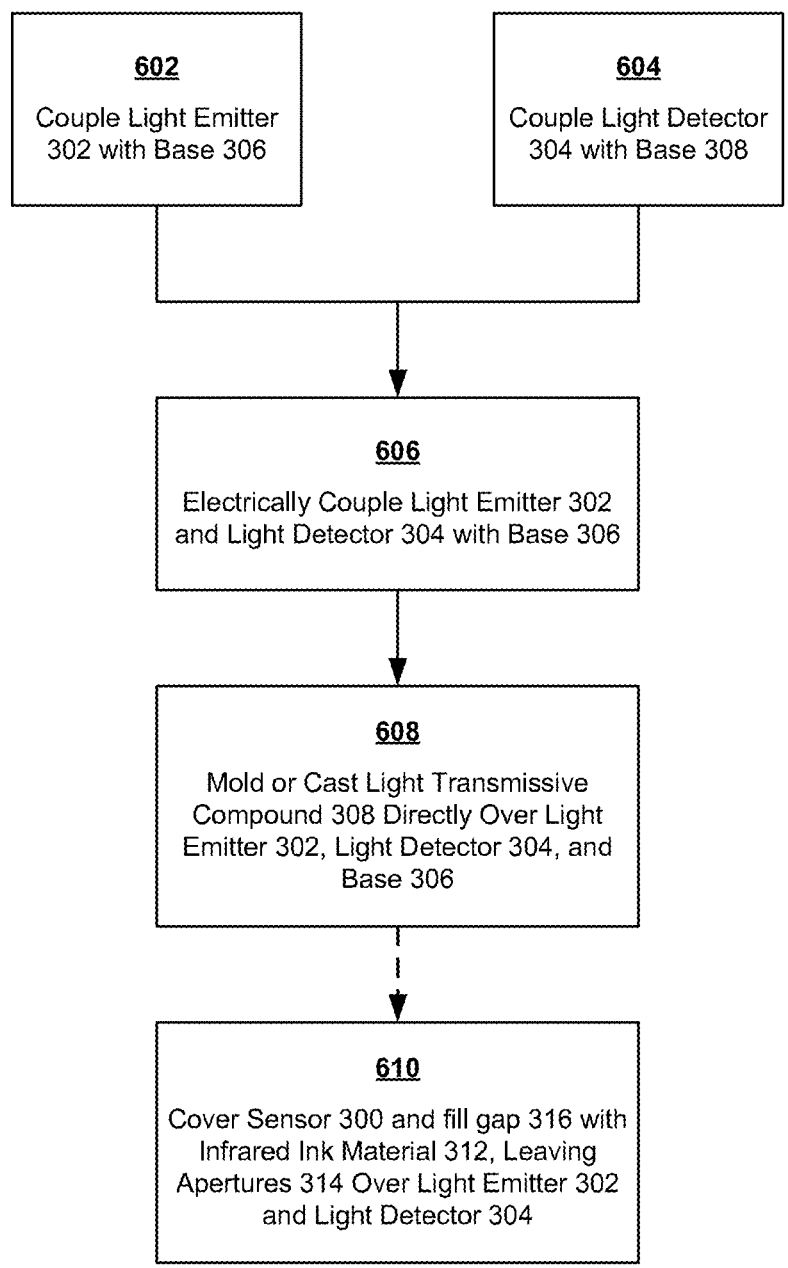
FIG. 6 depicts a process for manufacturing a sensor comprising an infrared light blocking ink partially covering and inhibiting direct communication between a light emitter and light detector.
Figure 7:
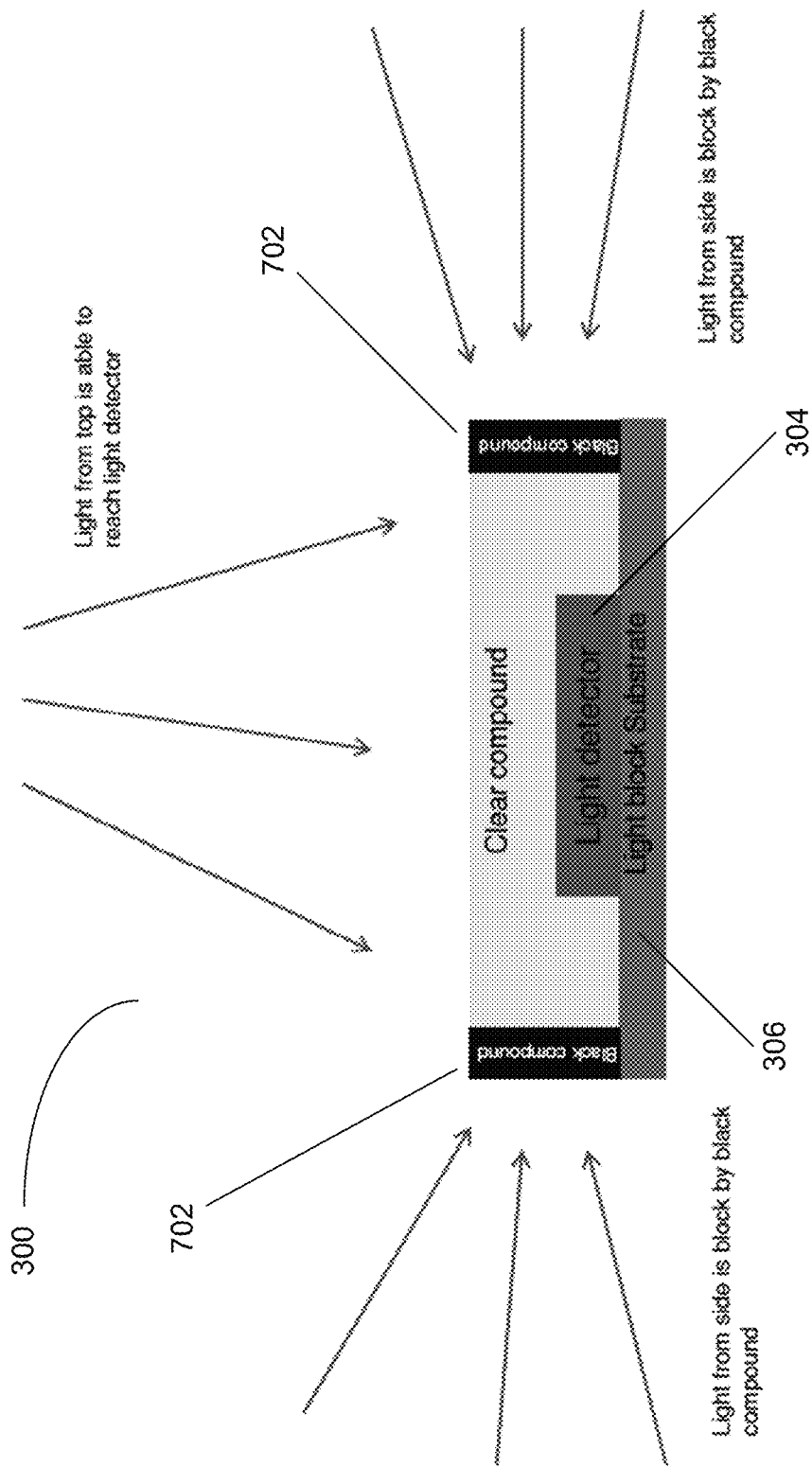
FIG. 7 depicts an alternate embodiment of a sensor comprising a light blocking barrier inhibiting light detection from laterally projected light.
Figure 8:
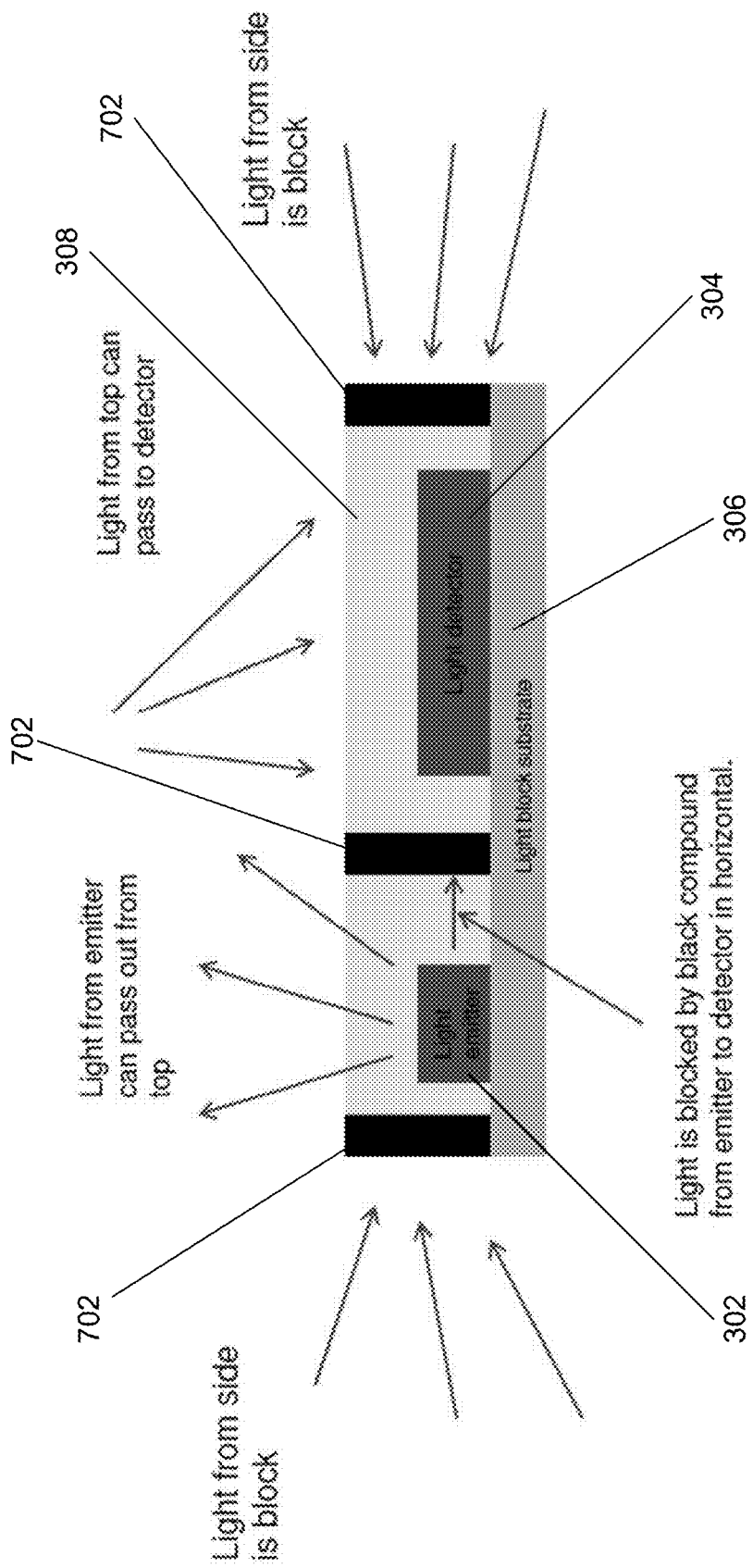
FIG. 8 depicts an alternate embodiment of a sensor comprising a light blocking barrier inhibiting direct communication between a light emitter and light detector.
Figure 9:
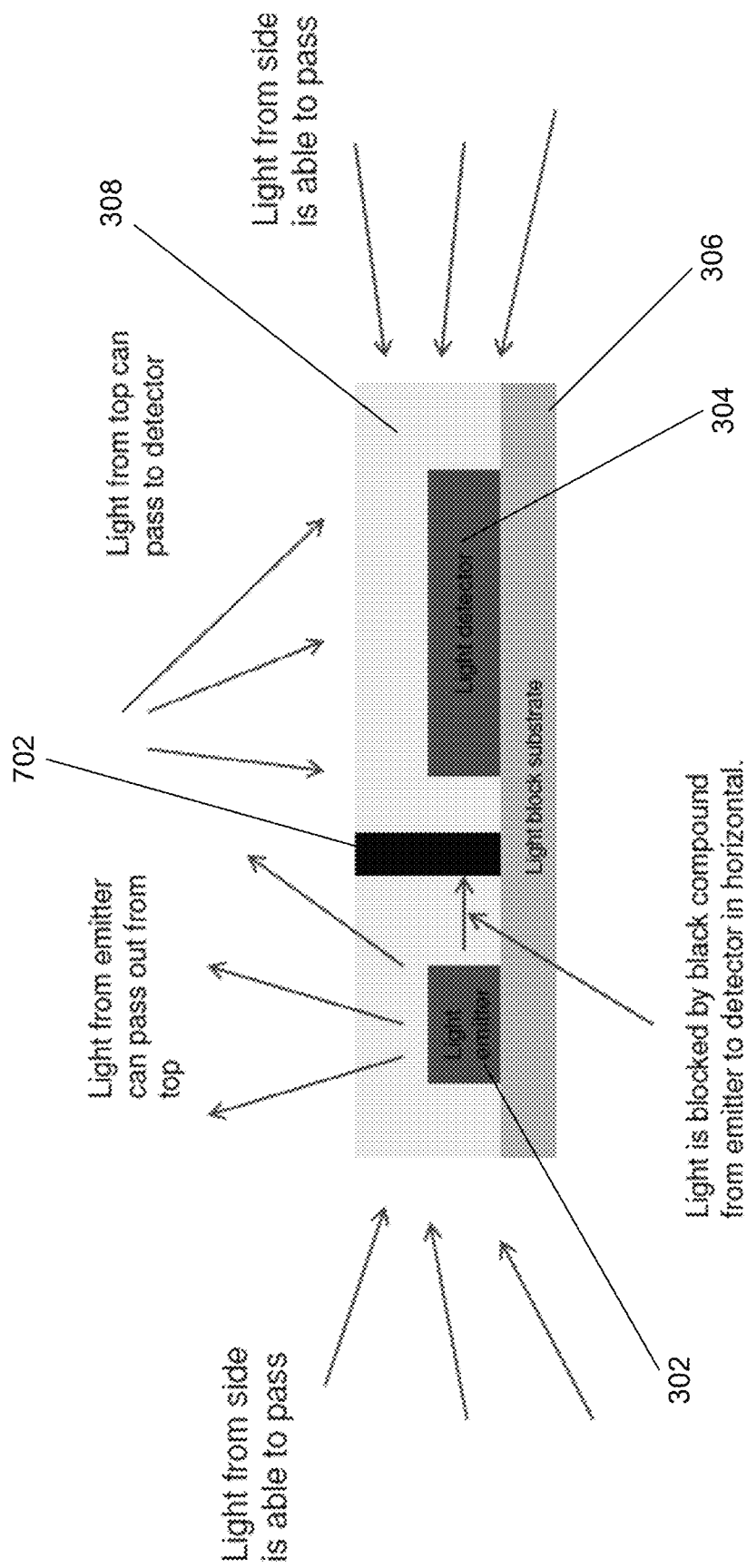
FIG. 9 depicts an alternate embodiment of a sensor comprising a light blocking barrier inhibiting direct communication between a light emitter and light detector.

FIG. 6 depicts steps of a process for making a sensor 300 with a layer of optically transmissive compound 308 directly covering a light emitter 302 and a light detector 304. At steps 602 and 604, a light emitter 302 and a light detector 304 can be mounted on different locations on a base 306. By way of non-limiting examples, a light emitter 302 and light detector 304 can each be mounted to the top of a base 306 using adhesives, screws, bolts, solder, or any other known and/or convenient coupling mechanism.

At step 606, a light emitter 302 and light detector 304 can be electrically coupled with conductive elements of a base 306. By way of a non-limiting example, wirebonding 310 can be used to separately connect a light emitter 302 and light detector 304 to a base 306.

At step 608, a layer of optically transmissive compound 308 can be molded or cast over the structure formed by a light emitter 302, light detector 304, and base 306, to encapsulate a light emitter 302 and light detector 304 within an optically transmissive compound 308. A gap 316 can be included in the layer of optically transmissive compound 308. By way of a non-limiting example, an optically transmissive compound 308 can be molded over a light emitter 302, light detector 304, and base 306 using a transfer molding machine or any other known and/or convenient molding device. An optically transmissive compound 308 can directly cover the tops and sides of a light emitter 302 and light detector 304 and can fill the space between a light emitter 302 and light detector 304 above a base 306. An infrared ink 312 can be applied to fill a gap 316.

In some embodiments, the process can end after step 608. However, in other embodiments the process can continue to step 610, during which opaque light blocking material and/or infrared ink 312 can be applied, molded, cast, or placed around the sides and top of a sensor 300. An opaque light blocking material and/or infrared ink 312 can be in direct contact with the exterior of a cured optically transmissive compound 308. The opaque light blocking material and/or infrared ink 312 can be formed with two apertures 314, with one being positioned above a light emitter 302 and one being positioned above a light detector 304.

In some embodiments a single sensor 300 can be manufactured with the process of FIG. 6. In other embodiments, a sheet of contiguous sensors 300 can be manufactured according to the steps of FIG. 6, and a sheet of contiguous sensors 300 can be singulated with a precision saw machine, metal stamping machine, or any other desired method to separate out individual sensors 300. By way of a non-limiting example, a large sheet of continuous bases 306 can be provided, and sets of light emitters 302 and light detectors 304 can be mounted to and electrically coupled with the bases 306 within the sheet. A layer of optically transmissive compound 308 can be molded or cast over the sheet with appropriately positioned gaps 316, directly covering each pair of light emitters 302 and light detectors 304, and infrared ink 312 can be used to fill gaps 316. After an optically transmissive compound 308 and infrared ink 312 have cured over the entire sheet, the sheet can be singulated to separate out individual sensors 300.

FIGS. 7-10 depict alternate embodiments of a sensor 300 comprising a light blocking barrier 702 inhibiting direct communication between a light emitter 302 and light detector 304. In the embodiments depicted in FIGS. 7-10 a light blocking barrier 702 can be located between a light emitter 302 and light detector 304. In the embodiments depicted in FIGS. 7-10, a light blocking barrier 702 can have the structure of a vertical wall rising orthogonally from a base substrate 306. However, in alternate embodiments a light blocking barrier 702 can have any known, convenient and/or desired geometric properties such that the light blocking barrier 702 can inhibit the direct reception of light from a light source or emitter 302 coupled with the same base/substrate 306 as a detector 304. In some embodiments a barrier 702 can be comprised of a light blocking compound, such as NT8570/GE100. However, in alternate embodiments, a light blocking barrier 702 can be comprised of any known, convenient and/or desired material, or compound capable of inhibiting the direct reception of light from a light source or emitter 302 coupled with the same base/substrate 306 as a detector 304. In some alternate embodiments a light blocking barrier 702 can be comprised of more than one light blocking barrier 702. Multiple barriers 702 can be similar or different in composition and/or structure.

Figure 11A:
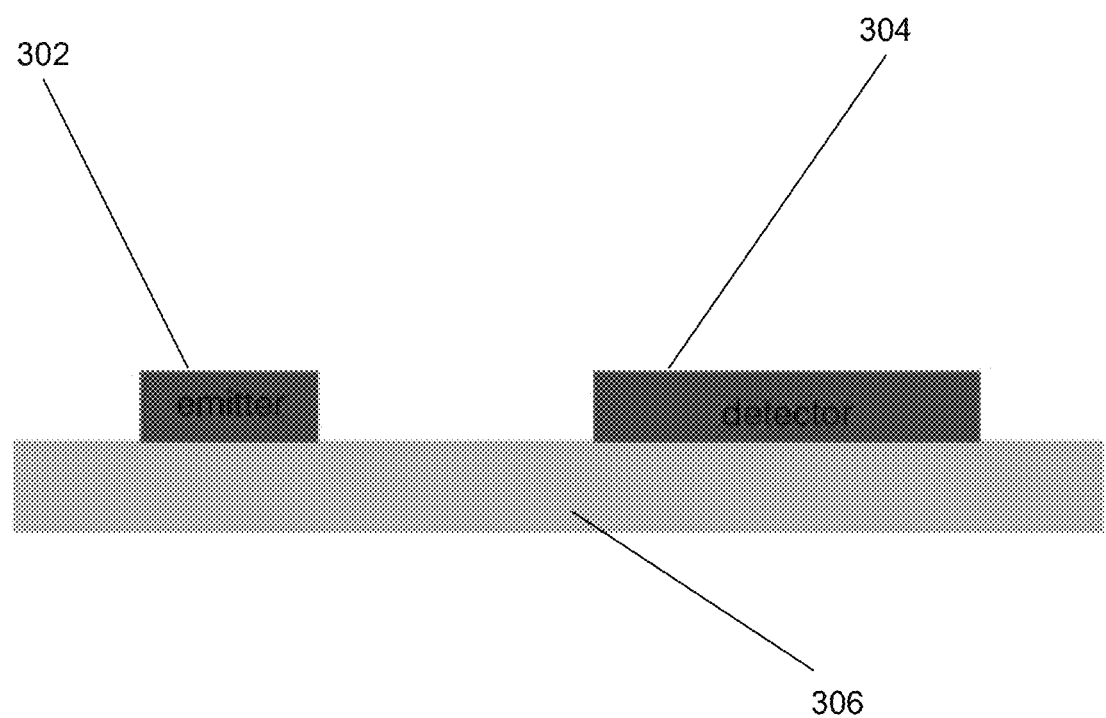
FIGS. 11a-11d depict embodiments showing fabrication of an embodiment of a sensor comprising a light blocking barrier inhibiting direct communication between a light emitter and light detector.

FIG. 11a-11d depict embodiments showing fabrication of an embodiment of a sensor comprising a light blocking barrier 702 inhibiting direct communication between a light emitter 302 and light detector 304. FIG. 11a depicts an emitter 302 and detector 304 coupled with a substrate/base

Figure 11B:
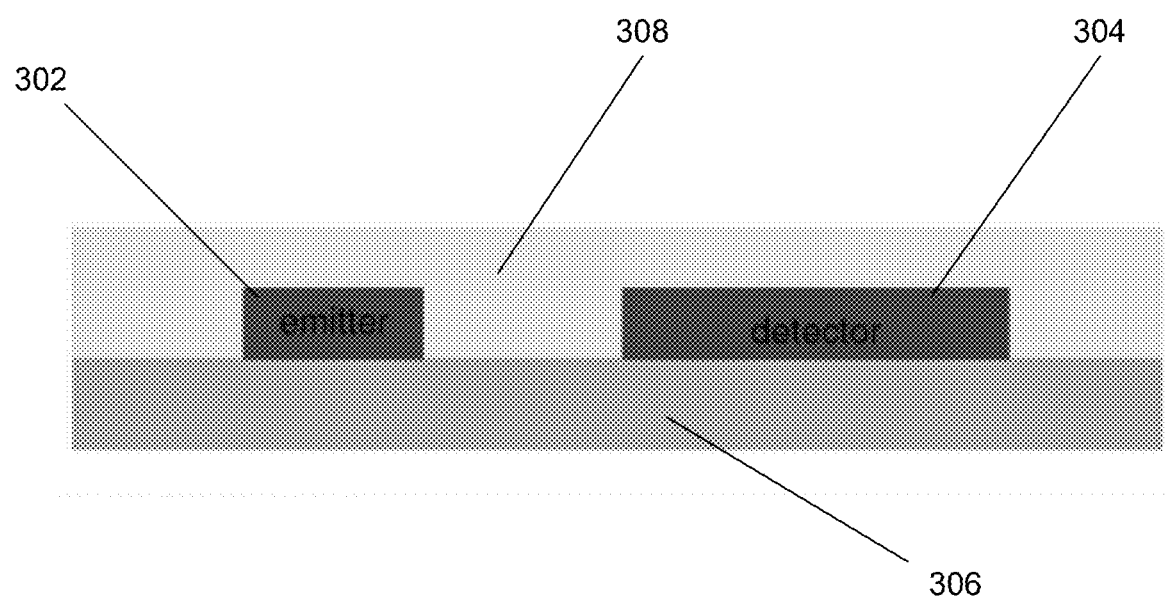

306. FIG. 11*b* depicts an emitter 302 and detector 304 coupled with a substrate or substrate/base 306 and covered with a light transmissive compound 308. In some embodiments a light transmissive compound 308 can be NT8506/NT330. However, in alternate embodiments any known, convenient and/or desired light transmissive compound and/or material can be used.

Figure 11C:
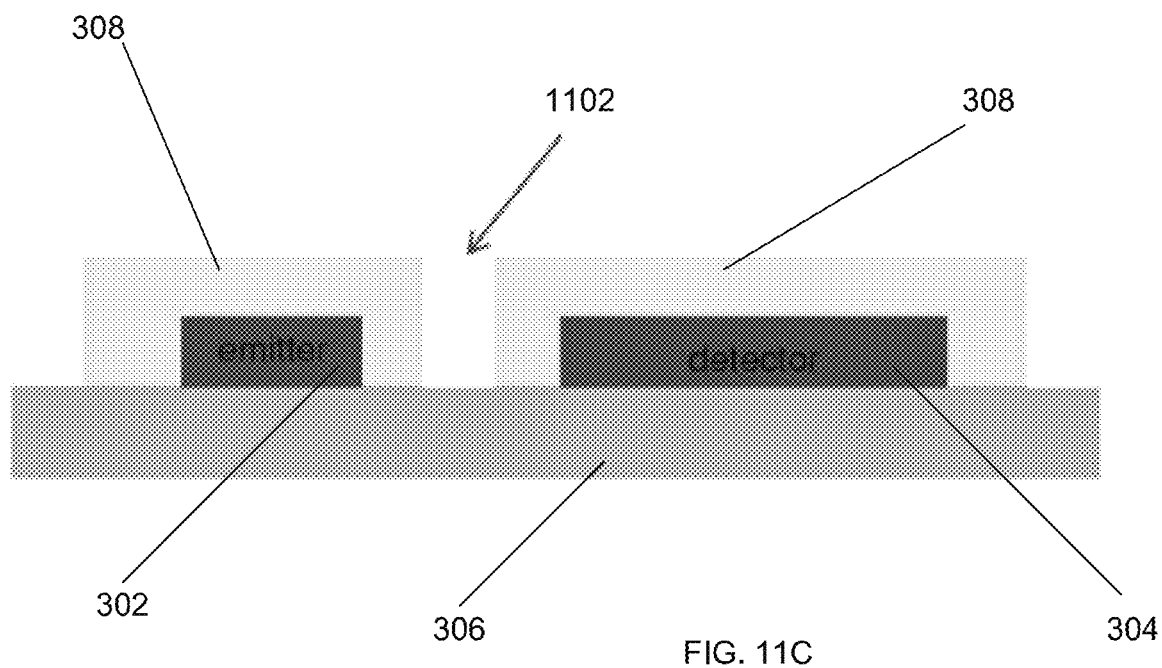
Figure 11D:
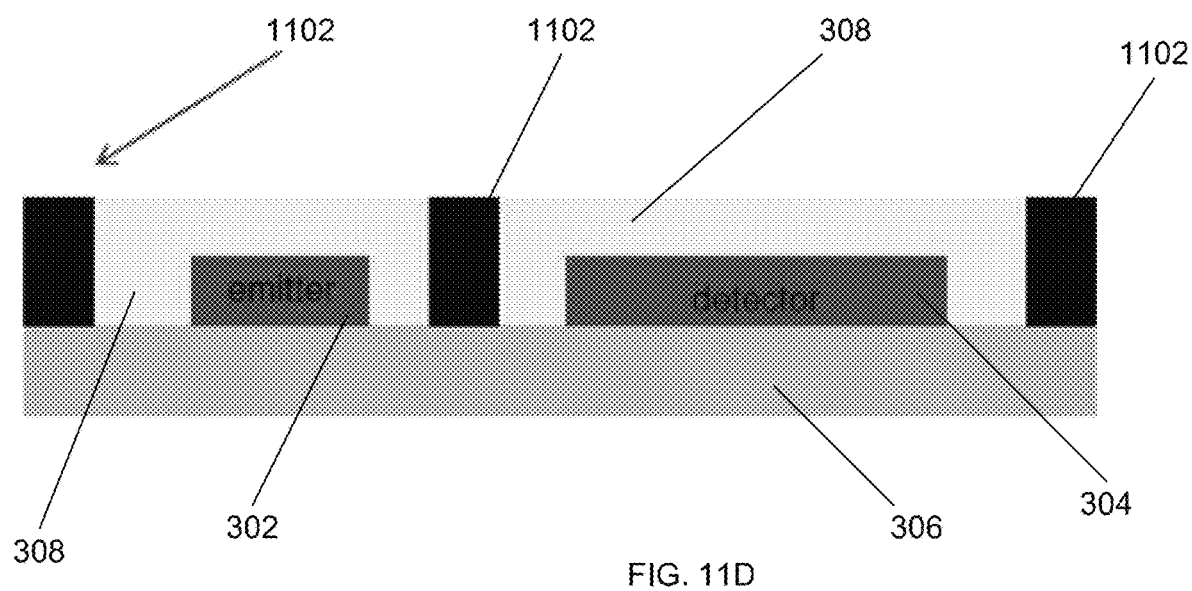

FIG. 11*c* depicts an emitter 302 and detector 304 coupled with a substrate or substrate/base 306 and covered with a light transmissive compound 308 wherein light blocking barrier areas 1102 have been formed in a light transmissive compound 308. Again, while each barrier area 1102 is depicted as a single barrier area, in some embodiments individual barrier areas 1102 can be comprised of multiple barrier areas or multiple layers. FIG. 11*d* depicts an emitter 302 and detector 304 coupled with a substrate or substrate/base 306 and covered with a light transmissive compound 308 with light blocking barrier areas 1102, wherein the light blocking barrier areas 1102 have been filled with a light blocking compound 1106.

Figure 12:
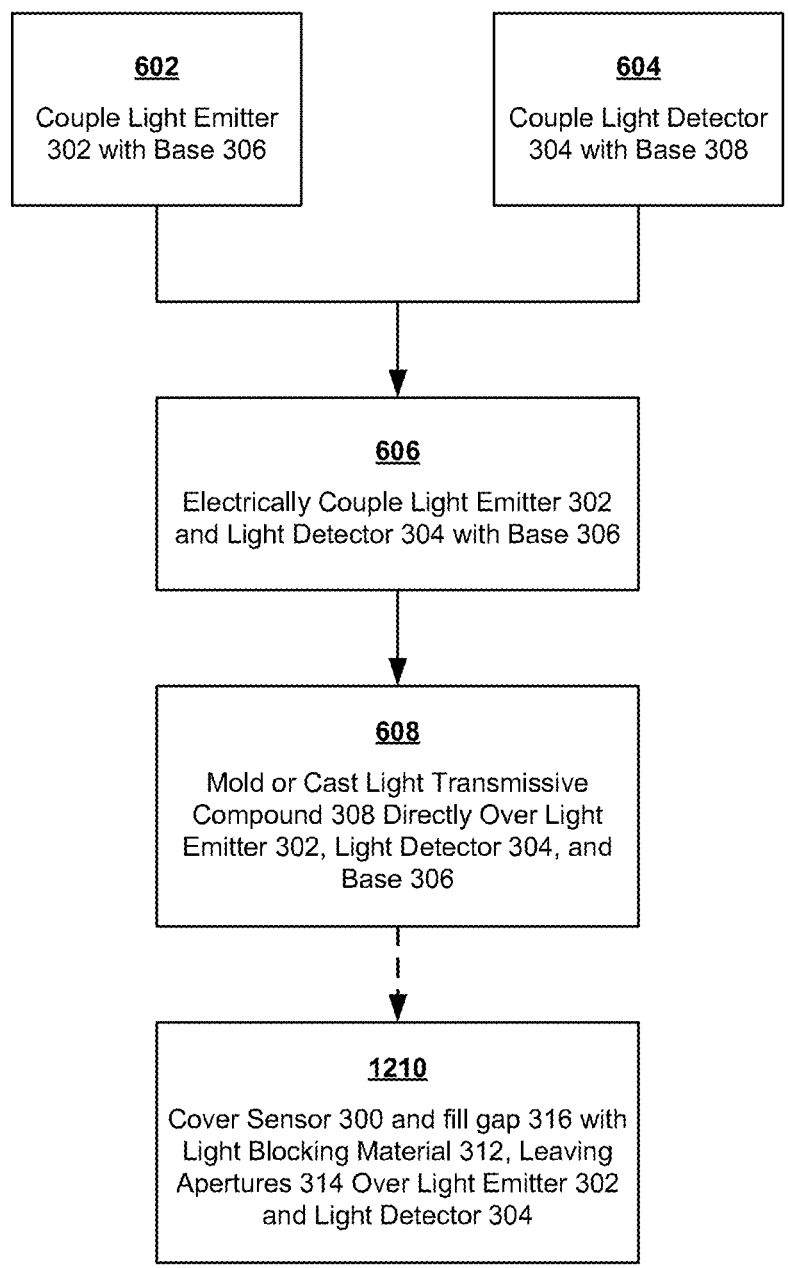
FIG. 12 depicts a process for manufacturing a sensor comprising a light blocking barrier inhibiting direct communication between a light emitter and light detector.

FIG. 12 depicts steps of a process for making a sensor 300 with a layer of optically transmissive compound 308 directly covering a light emitter 302 and a light detector 304. At steps 602 and 604, a light emitter 302 and light detector 304 can be mounted on different locations on a base 306. By way of non-limiting examples, a light emitter 302 and light detector 304 can each be mounted to the top of a base 306 using adhesives, screws, bolts, solder, or any other known and/or convenient coupling mechanism.

At step 606, a light emitter 302 and light detector 304 can be electrically coupled with conductive elements of a base 306. By way of a non-limiting example, wirebonding 310 can be used to separately connect a light emitter 302 and a light detector 304 to a base 306.

At step 608, a layer of optically transmissive compound 308 can be molded or cast over the structure formed by a light emitter 302, light detector 304, and base 306, to encapsulate a light emitter 302 and light detector 304 within an optically transmissive compound 308. A gap 316 can be included in the layer of optically transmissive compound 308. By way of a non-limiting example, an optically transmissive compound 308 can be molded over a light emitter 302, light detector 304, and base 306 using a transfer molding machine or any other known and/or convenient molding device. An optically transmissive compound 308 can directly cover the tops and/or sides of a light emitter 302 and light detector 304 and can fill the space between a light emitter 302 and light detector 304 above a base 306.

Then a light blocking compound 312 can be applied to fill a gap 316 or light blocking barrier areas 1102. The process can continue to step 1202, during which a light blocking compound 312 can be applied, molded, cast, or placed around the sides and top of a sensor 300. An opaque light blocking material and/or infrared ink 312 can be in direct contact with the exterior of a cured optically transmissive compound 308. An opaque light blocking material and/or infrared ink 312 can be formed with two apertures 314, with one being positioned above a light emitter 302 and one being positioned above a light detector 304.

In some embodiments a single sensor 300 can be manufactured with the process of FIG. 6. In other embodiments, a sheet of contiguous sensors 300 can be manufactured according to the steps of FIG. 6, and the sheet of contiguous sensors 300 can be singulated with a precision saw machine, metal stamping machine, or any other desired method or device to separate out individual sensors 300. By way of a non-limiting example, a large sheet of continuous bases 306 can be provided, and sets of light emitters 302 and light detectors 304 can be mounted to and electrically coupled with bases 306 within the sheet. A layer of optically transmissive compound 308 can be molded or cast over the sheet with appropriately positioned gaps 316 and/or light blocking barrier areas 1102, directly covering each pair of light emitters 302 and light detectors 304 and infrared ink 312 can be used to fill gaps 316. After an optically transmissive compound 308 and infrared ink 312 have cured over the entire sheet, the sheet can be singulated to separate out individual sensors 300.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A sensor, comprising:
a light emitter mounted on a first position on a base, wherein said base further comprises electrically conductive and non-conductive elements;
a light detector mounted on a second position on said base, wherein said light emitter and light detector are electrically connected via said electrically conductive elements;
a first region of optically transmissive material covering said light emitter having a top surface;
a second region of optically transmissive material covering said light detector having a top surface, wherein said first and second regions of optically transmissive materials define a gap having a cross-section with parallel walls, wherein said walls are substantially perpendicular to the top surfaces of a first region and a second region of an optically transmissive material;
an infrared-blocking ink contained within said gap;
wherein said ink can at least partially cover a top surface of said first region of optically transmissive material,
wherein said ink can at least partially cover a top surface of said second region of optically transmissive material, and
said ink filling said gap is substantially contiguous with said ink covering said top surface of said first region of optically transmissive material and said ink covering said second region of optically transmissive material.

2. The sensor of claim 1, further comprising:
a layer of light-blocking material covering said optically transmissive materials;
a first aperture through said layer of light-blocking material located substantially directly above said light emitter;
a second aperture through said layer of light-blocking material located substantially directly above said light detector.

3. The sensor of claim 2, wherein said layer of light-blocking material is comprised of infrared ink.

4. The sensor of claim 1, wherein said layer of light blocking material further comprises multiple layers.

5. A method of fabricating a sensor comprising the steps:
coupling a light emitter and a light detector with a base component;
electrically coupling said light emitter with and said light detector with said base;

molding a light-transmissive compound in substantially direct contact with said light emitter, light detector, and base component, defining a gap between said emitter and said detector;

wherein said gap has a cross-section with parallel walls and said walls defining said gap are substantially perpendicular to the top surface of the light-transmissive compound;

covering sensor and filling said gap with a light-blocking material.

6. The method of claim 5, further comprising the steps:

molding a light-transmissive compound leaving an uncovered area on a substrate edge, and;

covering said uncovered substrate edge with a light-blocking material to a thickness substantially that of the light-transmissive compound layer covering said emitter and detector.

7. The method of claim 5, further comprising the step of:

leaving an aperture substantially directly above said emitter and another aperture substantially directly above said detector.

8. The method of claim 5, further comprising the steps:

creating a sheet of multiple contiguous sensors;

singulating said sensors into individual units.

\* \* \* \* \*